(12) United States Patent
Cox

(10) Patent No.: US 8,266,994 B2
(45) Date of Patent: Sep. 18, 2012

(54) POWER MITER SAW HAVING REMOVABLE LOWER GUARD OPERATING MECHANISM

(75) Inventor: Matthew D. Cox, Lake In The Hills, IL (US)

(73) Assignee: Robert Bosch GmbH, Stuttgart (DE)

( * ) Notice: Subject to any disclaimer, the term of this patent is extended or adjusted under 35 U.S.C. 154(b) by 641 days.

(21) Appl. No.: 12/432,297

(22) Filed: Apr. 29, 2009

(65) Prior Publication Data

US 2010/0275755 A1 Nov. 4, 2010

(51) Int. Cl.
*B26D 5/00* (2006.01)
(52) U.S. Cl. ............................................. 83/397; 83/473
(58) Field of Classification Search .................... 83/490, 83/483, 397, 471.3, 473, 478
See application file for complete search history.

(56) References Cited

U.S. PATENT DOCUMENTS

| | | | | | |
|---|---|---|---|---|---|
| 1,807,120 | A | * | 5/1931 | Lewis | 83/471.2 |
| 3,612,185 | A | * | 10/1971 | Grauberger et al. | 172/314 |
| 3,998,121 | A | * | 12/1976 | Bennett | 83/471.3 |
| 4,028,975 | A | * | 6/1977 | Bennett | 83/397 |
| 4,318,324 | A | * | 3/1982 | Hall et al. | 83/397 |
| 4,581,966 | A | * | 4/1986 | Kaiser et al. | 83/397 |
| 4,774,866 | A | * | 10/1988 | Dehari et al. | 83/478 |
| 4,793,399 | A | * | 12/1988 | Pryor | 160/345 |
| 4,805,504 | A | * | 2/1989 | Fushiya et al. | 83/397 |
| 4,934,233 | A | * | 6/1990 | Brundage et al. | 83/397 |
| 5,042,348 | A | * | 8/1991 | Brundage et al. | 83/471.3 |
| 5,203,245 | A | * | 4/1993 | Terpstra | 83/397 |
| 5,893,311 | A | * | 4/1999 | Huang | 83/397 |
| 5,937,720 | A | * | 8/1999 | Itzov | 83/397 |

(Continued)

FOREIGN PATENT DOCUMENTS

CN 1404952 * 3/2003

OTHER PUBLICATIONS

Parmley, R.O. "Illustrated SOurcebook of Mechanical Components" © 200 McGraw-Hill. pp. 9-11 through 9-13.*

(Continued)

*Primary Examiner* — Sean Michalski
(74) *Attorney, Agent, or Firm* — Greer, Burns & Crain, Ltd.

(57) ABSTRACT

Embodiments of a power miter saw of the type which has an upper fixed blade guard for encasing upper reaches of an installed saw blade without encasing the blade arbor, and a lower swinging blade guard for covering the lower reaches of an installed blade when saw is in its rest position and for exposing the saw blade when moved to its operational position, the saw comprising an elongated linkage mechanism having opposite end portions interconnecting a frame support and the lower blade guard for moving the lower blade guard in response to movement of the saw between the rest and operational positions, such that the lower blade guard covers the lower reaches of the blade when the saw is in its rest position and uncovers the lower reaches of the blade when the saw is moved to its operational position, the linkage mechanism being configured to be selectively detachable from the frame support, thereby enabling the lower blade guard to be placed in at least first and second positions wherein the first position enables normal movement of the saw between its rest and operational positions, and the second position wherein the lower blade guard is raised to expose a blade arbor to facilitate changing of the blade.

18 Claims, 7 Drawing Sheets

U.S. PATENT DOCUMENTS

| | | | |
|---|---|---|---|
| 5,950,514 A * | 9/1999 | Benedict et al. | 83/397 |
| 6,012,622 A * | 1/2000 | Weinger et al. | 227/8 |
| 6,222,619 B1 * | 4/2001 | Herron et al. | 356/39 |
| 6,279,442 B1 * | 8/2001 | Chang | 83/397 |
| 6,945,148 B2 * | 9/2005 | Gass et al. | 83/62.1 |
| 6,971,297 B1 * | 12/2005 | Meredith et al. | 83/478 |
| 2006/0101967 A1 * | 5/2006 | Garcia et al. | 83/473 |
| 2009/0301278 A1 * | 12/2009 | Agan et al. | 83/471.3 |
| 2010/0242700 A1 * | 9/2010 | Cox | 83/471.3 |

OTHER PUBLICATIONS

Translation of Xie (CN 1404952).*

* cited by examiner

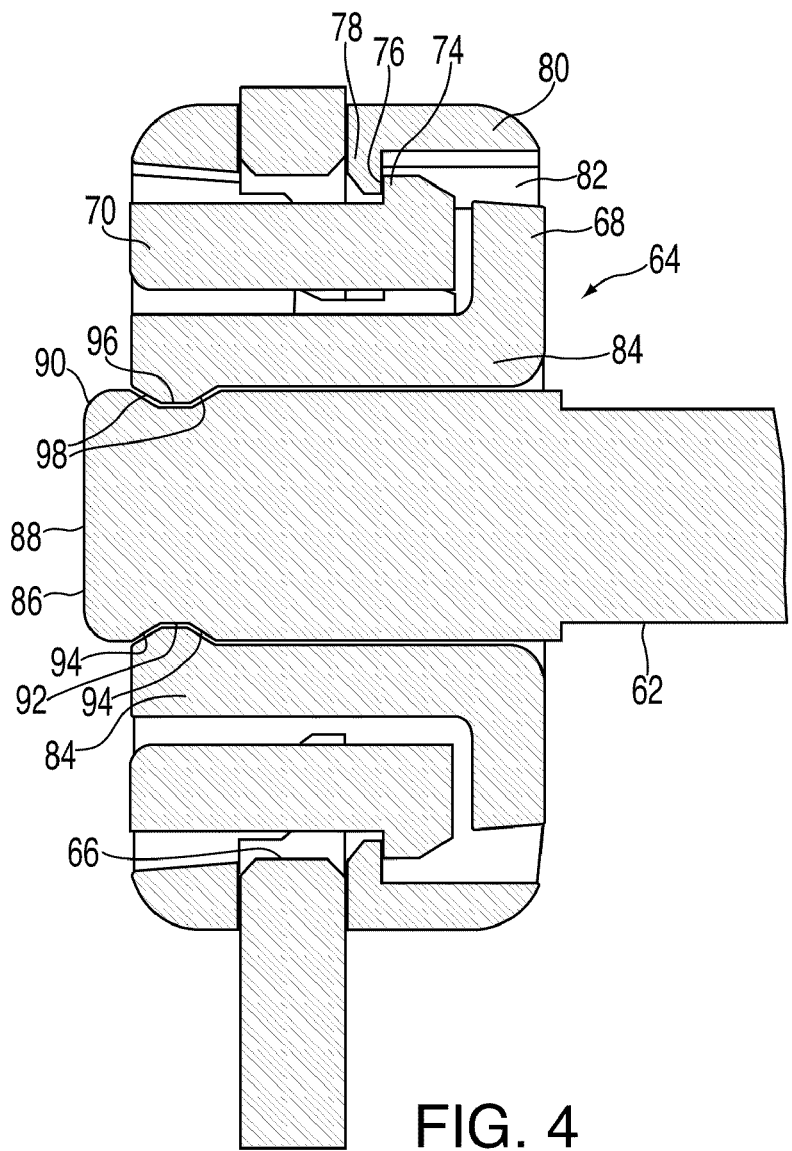
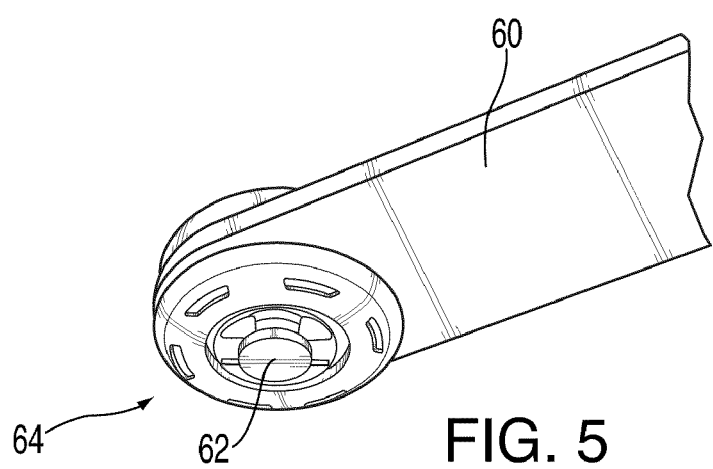

POWER MITER SAW HAVING REMOVABLE LOWER GUARD OPERATING MECHANISM

BACKGROUND OF THE INVENTION

The present invention generally relates to power miter saws and similar power saws.

The design and development of power tools and particularly power saws, such as miter saws, for example, have produced saws that are extremely sophisticated and not only provide reliable and accurate cutting of work pieces, but also are much safer to operate. Such safety considerations have greatly changed the configuration of miter saws over several decades. One of the major changes involves the protection of a user from the rotating saw blade by having not only an upper generally fixed blade guard as part of the design of the motor and blade assembly, but also a swinging lower blade guard that is pivoted out of the way to expose the lower portion or reach of the blade for cutting as the motor and blade assembly is lowered into its operating position to cut a work piece. When the cut is completed and the motor and blade assembly rotated upwardly to return to its normal rest position, the lower blade guard is automatically rotated into position to cover the lower reach of the blade.

As is the case for some known miter saws that are currently marketed, the geometry of the miter saw prevents a lower guard from rolling back away from the saw blade for the purpose of having access to the blade arbor as required when it is desired to change the blade. The actuating link of the lower guard is connected to a frame support and does not normally permit this type of movement. For many designs, it is therefore necessary to at least partially disassemble the saw in order to obtain access to the arbor so that the blade can be changed. The amount of disassembly varies depending upon the particular saw, but is often inconvenient and time consuming.

SUMMARY OF THE INVENTION

Embodiments of the present invention permit the lower guard linkage linking mechanism to be easily manipulated to place the lower guard to be rotated out of the way and be temporarily held in a position which exposes the blade and arbor to permit the user to change the blade.

Embodiments of the present invention is directed to a power miter saw of the type which has an upper fixed blade guard for encasing upper reaches of an installed saw blade without encasing the blade arbor, and a lower swinging blade guard for covering the lower reaches of an installed blade when saw is in its rest position and for exposing the saw blade when moved to its operational position. The saw includes an elongated linkage mechanism having opposite end portions interconnecting a frame support and the lower blade guard for moving the lower blade guard in response to movement of the saw between the rest and operational positions, such that the lower blade guard covers the lower reaches of the blade when the saw is in its rest position and uncovers the lower reaches of the blade when the saw is moved to its operational position. The linkage mechanism is configured to be selectively detachable from the frame support, thereby enabling the lower blade guard to be placed in at least first and second positions wherein the first position enables normal movement of the saw between its rest and operational positions, and the second position wherein the lower blade guard is raised to expose a blade arbor to facilitate changing of the blade.

One embodiment of the invention has a linkage mechanism that has one end that can be easily detached so that the lower blade guard can be raised to the second position and then reattached to hold it in the second position.

Another embodiment has a linkage mechanism that has one end that can be easily detached so that the lower blade guard can be raised to the second position and then conveniently uses an opening in the linkage in combination with a necessarily loosened screw to hold the lower blade guard in the second position.

DESCRIPTION OF THE DRAWINGS

FIG. 4 is a cross-section taken through the snap-fit connection of a link to a post on the miter saw;

FIG. 5 is a plan view of a portion of the link together with the snap-fit connection;

DETAILED DESCRIPTION

The present invention is particularly suited for use in a power miter saw of the type which has a compound action as well as being adjustable to perform cuts at different miter angles as well as different bevel angles. With the miter saw having a motor and blade assembly that is pivotable along a generally horizontal axis downwardly into contact with a work piece that is placed on a table of the miter saw and wherein the motor and blade assembly includes an upper fixed blade guard as well as a swingable (i.e., rotatable) lower blade guard that is configured to completely encase the blade so that a user cannot contact the blade when the motor and blade assembly is in its upper rest position. However, the present invention includes embodiments that are useful in other types of saws of the type which have a lower blade guard associated with them.

Figure 1:
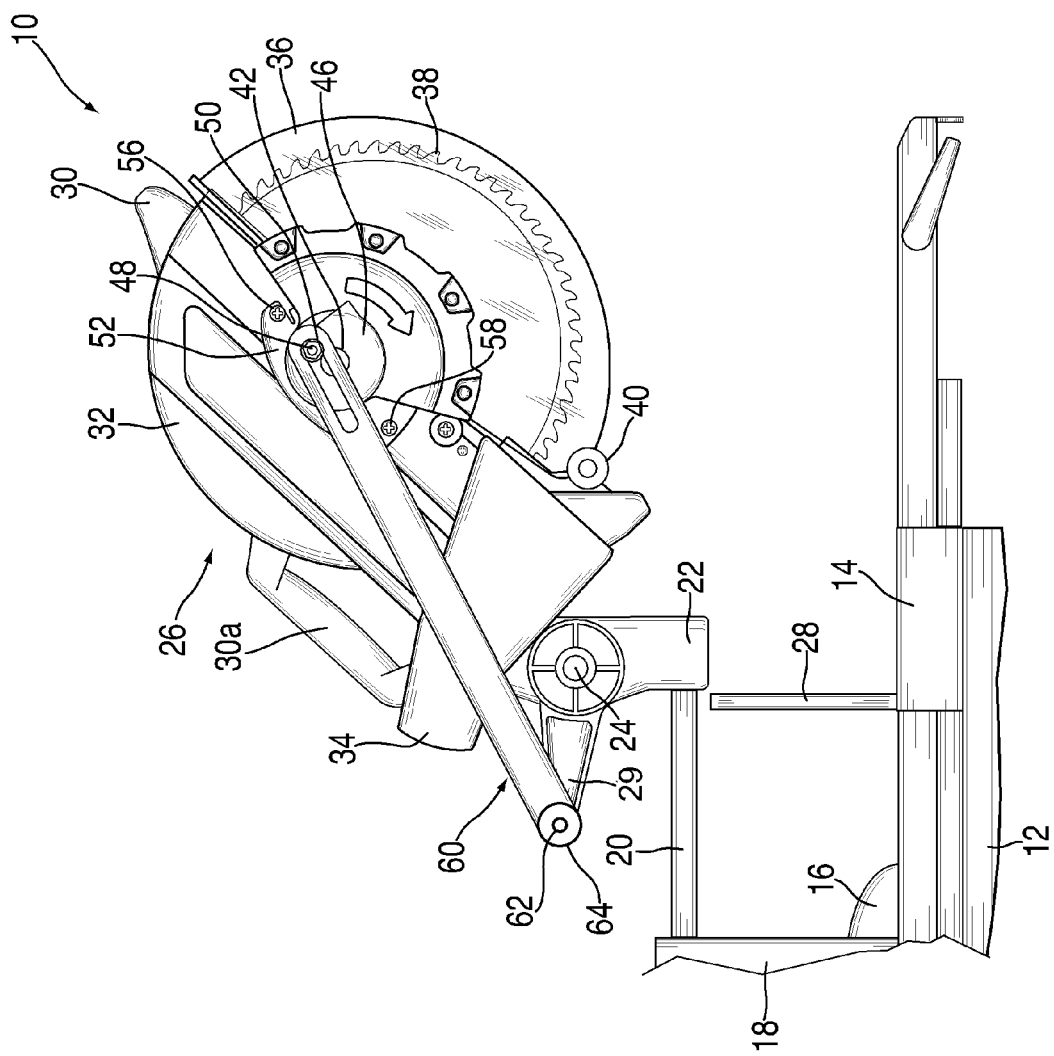
FIG. 1 is a side plan view of a portion of a compound miter saw, particularly illustrating a portion of the saw base and table and a frame support supporting a blade and motor assembly, and also illustrating a linkage mechanism for a lower swinging blade guard, with the motor and blade assembly in a rest or non-operating position.

Turning now to the drawings, and particularly FIG. 1, a compound miter saw, indicated generally at 10, that includes a partially shown base 12, a rotatable table 14 that has a hub 16 which is connected to a vertical stand 18 to which a pair of rods 20 (only one of which is visible in FIG. 1) can move horizontally to provide compound action of the saw to increase the length of cut that is possible with the saw. The forward end of the rods 20 are connected to a frame support 22 that has a horizontal shaft 24 that pivotally supports a motor and blade assembly that is indicated generally at 26. It should be understood that the present invention can also be used for a non-sliding type of miter saw.

As is typical, the table 14 has a fence 28 which is provided to anchor a work piece that may be placed on the table 14. The frame support 22 has a rearward extension 29 that is preferably integrally formed with the frame support 22. The motor and blade assembly 26 has a handle 30 as well as a carry handle portion 30a. The handle 30 is used by a user to pivot the motor and blade assembly 26 downwardly toward the table 14 for cutting a work piece that is positioned on the table. The motor and blade assembly 26 preferably has an upper blade guard portion that is preferably cast together with other components to include the motor (not shown), a dust collecting portion 34.

Figure 2:
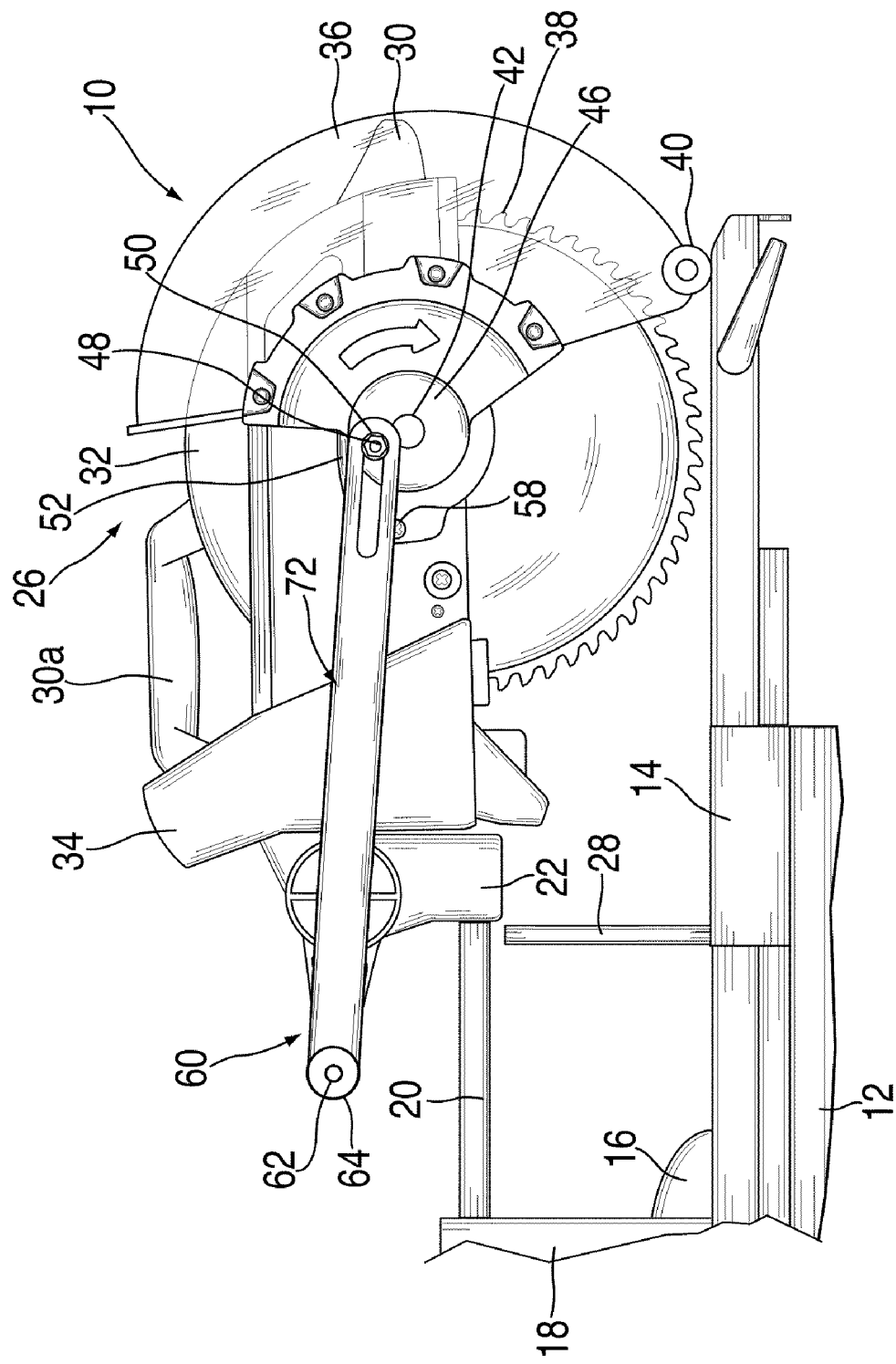
FIG. 2 is a side plan view similar to FIG. 1, but illustrating the saw with the blade and motor assembly pivoted downwardly into an operating position.

A rotatable lower blade guard 36 is shown with the blade 38 being visible, preferably because the lower blade guard 36 is formed of a transparent or nearly transparent plastic material so that a user can see if the blade 38 is moving or not. The lower blade guard 36 has a small roller 40 located on its bottom which acts as a bumper for contacting the top surface of the table 14 when the motor and blade assembly is brought down into cutting position as shown in FIG. 2.

The lower blade guard pivots around an axis 42 that is generally concentric with the axis of an arbor 44 (see FIG. 3) to which the blade 38 is mounted. The pivot 42, however, is secured to the upper blade guard 32 and is not attached to the arbor 44. The pivot 42 has a generally circular hub portion 46 which has a post or bolt 48 that is preferably threaded to receive a nut 50 which defines an attachment pin for an elongated linkage mechanism, indicated generally at 60, the other end of which is connected to the rearward extension 29 that has a post 62 to which a snap-fit connector, indicated generally at 64 can be removably attached and which defines a connection point for the linkage mechanism 60.

Figure 3:
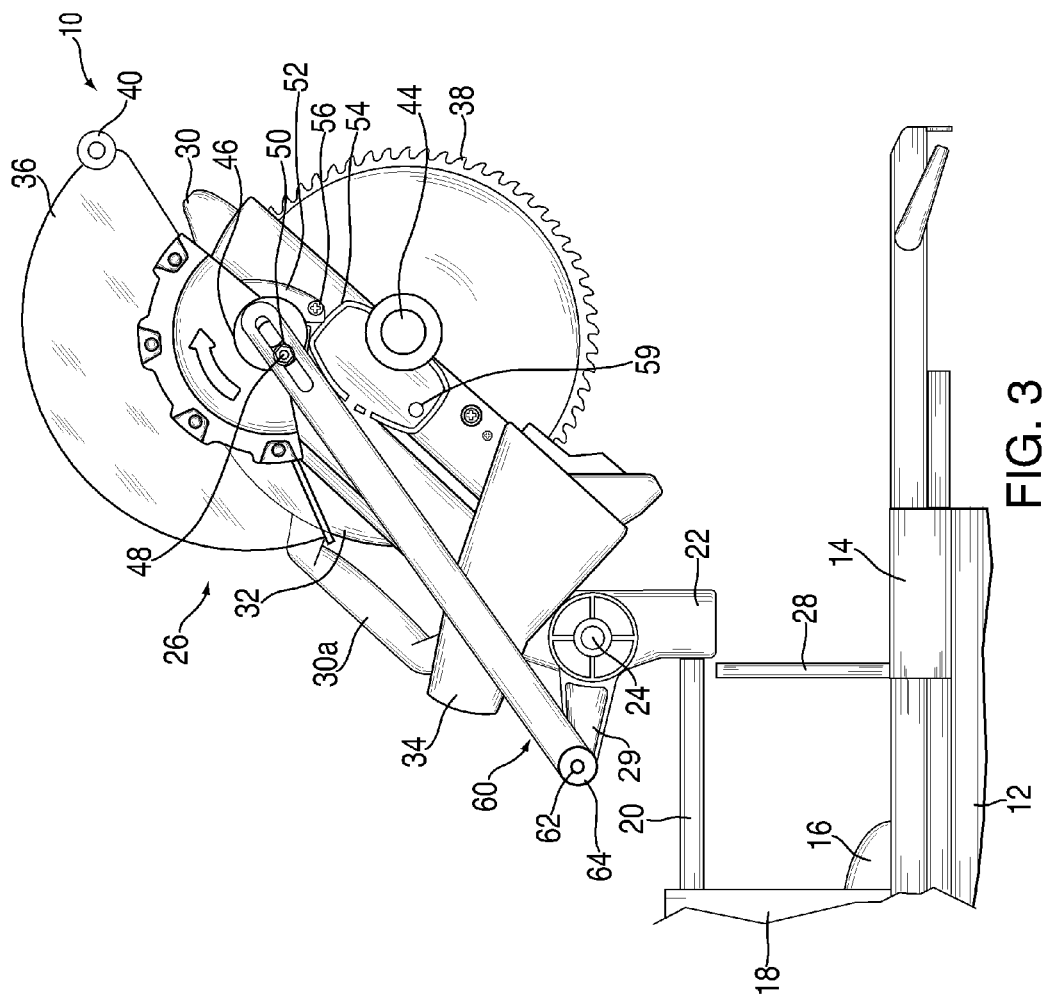
FIG. 3 is a side plan view of the saw shown in FIGS. 1 and 2, but illustrating the lower swinging blade guard pivoted to a position that exposes the blade arbor and blade thereby enabling a user to change the blade without interference from the swinging lower plate guard.

The upper post 48 is attached to a flat plate 52 that is generally shaped commensurate with a raised bead 54 outline as shown in FIG. 3 that is very generally shown as being rectangular. The plate 52 has its right end portion secured in the upper blade guard by a screw 56 and its opposite end portion secured by a screw 58.

The screw 58 fits within an opening 59 in the upper blade guard 32 as is particularly shown in FIG. 3, wherein the screw 58 has been removed from the opening 59 and the screw 56 has been loosened slightly so that the plate 52 is rotated about the screw 56 in a counter-clockwise direction thereby enabling the lower blade guard 36 to be rotated further away from the arbor 42 thereby enabling the arbor to be accessed and the blade removed or replaced if desired.

As is shown by comparing FIGS. 1 with 2, when the motor and blade assembly 26 is in its rest position shown in FIG. 1 where the blade is elevated relative to the table, the linkage mechanism 60 is positioned to have the lower blade guard 36 positioned as shown where it totally encloses the blade 38. However, when the handle 30 is moved downwardly to bring the blade in near contact with the upper surface of the table 14, the linkage mechanism 60, by virtue of the connection 48, rotates the lower blade assembly in a counter clockwise direction so that the lower reach of the blade is exposed and is enabled to cut a work piece (not shown).

To access the arbor and remove or replace the blade 38, the motor and blade assembly 26 is placed in its rest position and the linkage mechanism 60 is detached from the post 62. The lower blade guard 36 then is rotated in a counterclockwise direction so that the blade 38 is exposed, and the linkage mechanism is reattached to the post 62. In this manner, the lower blade guard 36 is maintained in the position that exposes the blade 38 and the plate 52 covering the arbor.

As is evident from FIGS. 1 and 2 showing the motor and blade assembly in the uppermost rest position and in an operating lower position, respectively, it is apparent that the arbor is covered by the lower blade assembly.

The elongated linkage mechanism 60 is preferably fabricated from steel and has an opening 66 (see FIG. 4) at the lower end of the linkage mechanism that is preferably a circular opening sized to receive the snap fit connector 64. The snap fit connection 64 is comprised of an inner component 68 and an outer component 70 which have a generally cylindrical configuration and snap fit together with each component extending through the opening 66 of the elongated linkage mechanism 60. More particularly, the outer component 70 has a number of fingers 72 with an outwardly extending ear 74 defining a shoulder 76 that is configured to engage corresponding ears 78 of outer periphery 80 of the inner component 68. The inner component has a number of recesses 82.

The inner component 68 has a number of fingers 84 that are spaced apart from one another and which generally surround the cylindrical post 62, i.e., they have an inside diameter that is approximately equal to the outside diameter of the post 62. The post has an outer free end 86 with a generally flat end surface 88 which preferably has a rounded curved periphery 90 that facilitates matching the snap fit connector onto the post 62. The post also has an annular groove 92 near the outer end surface 88. The groove has sloped sides 94 to facilitate attachment and detachment of the snap fit connection on the post. The fingers 84 have an inwardly directed protrusion 96 with sloped side portions 98 that are preferably angled generally the same as the angle of the sloped side portions of the groove 92 to also facilitate sliding attachment and detachment of the snap fit connector from the post 62. It should be understood that the snap fit connector is fabricated from a plastic or plastic-like material so that the fingers have resilience and are preferably made of polypropylene or similar material.

It should be understood that while the construction of the snap fit connector has inner and outer components that snap together and are more or less permanently retained in the opening 66 of the elongated linkage mechanism 60, it should be understood that alternative constructions for such a snap fit connection can be used, including forming a one piece snap fit connection around the opening 66 and end of the elongated linkage mechanism 60.

The second embodiment of the present invention is shown in FIGS. 6-9 and is directed to another type of compound miter saw and is indicated generally at 110 that includes a partially shown base 112, a rotatable table 114 that rotates around a hub 116 which is connected to a vertical stand 118 to which a pair of multilink hinges 120 and 121 are provided. The two hinges are oriented approximately 90° relative to one another and operate to move ahead support 122 in a horizontal direction. The head support 122 has a horizontal shaft 124 that pivotally supports a motor and blade assembly, indicated generally at 126. It should be understood that the present invention can also be used for a non-compound type of miter saw.

As is typical, the table 114 has a fence 128 which is provided to anchor a work piece that may be placed on the table 114. The motor and blade assembly 126 has a handle 130 which is used by a user to pivot the motor and blade assembly 126 downwardly toward the table 114 for cutting the work piece and is positioned on the table. The motor and blade assembly 126 preferably has an upper blade guard portion that is preferably an aluminum casting that also includes an extension 132 that carries a motor 134.

Figure 7:
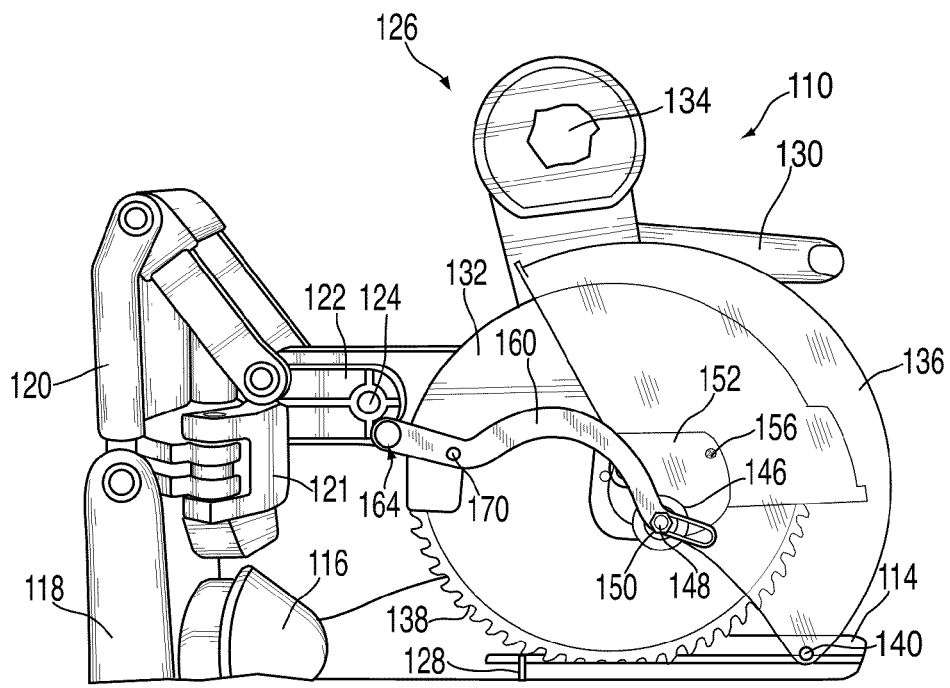
FIG. 7 is a side plan view similar to FIG. 6, but illustrating the saw with the blade and motor assembly pivoted downwardly into an operating position.

A rotatable lower blade guard 136 is shown with the blade 138 being visible, preferably because the lower blade guard 136 is formed of a transparent or nearly transparent plastic material so that a user can see if the blade 138 is moving or not. The lower blade guard 136 has a small roller 140 located on its bottom which acts as a bumper for contacting the top surface of the table 114 when the motor and blade assembly 126 is brought down into a cutting position as shown in FIG. 7.

The lower blade guard pivots around an axis 142 that is generally concentric with the axis of an arbor 144 (see FIG. 8) to which the blade 138 is mounted. The pivot 142, however, is secured in the upper blade guard 132 and is not attached to the arbor 144. The pivot 142 has a generally circular hub portion 146 which has a post or bolt 148 that is preferably threaded to receive a nut 150 which defines an attachment point for an elongated linkage mechanism, indicated generally at 160, the other end of which is connected to a post 162 located on the head portion 122, to which a thumb screw, indicated generally at 164, can be removably attached and which defines a connection point for the linkage mechanism 160.

Figure 8:
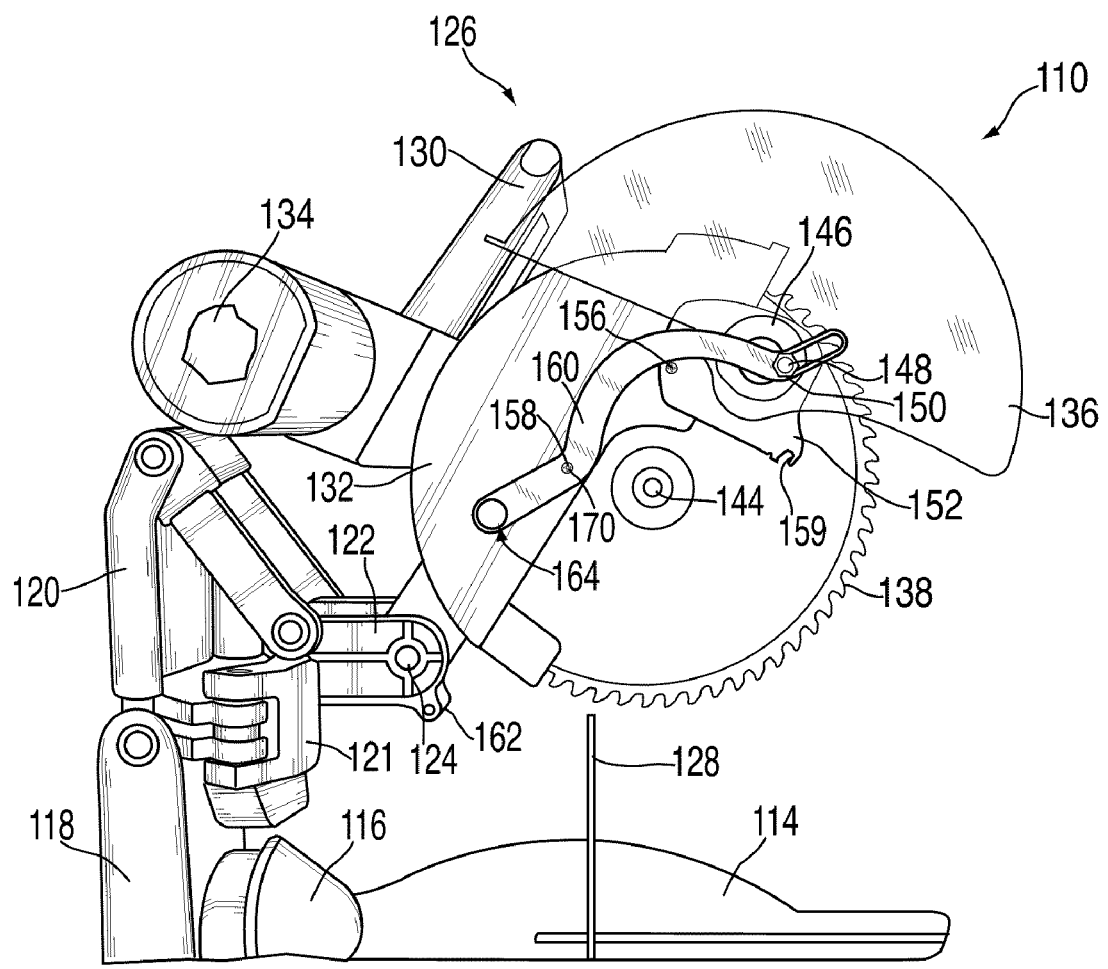
FIG. 8 is a side plan view of the saw shown in FIGS. 6 and 7, but illustrating the lower swinging blade guard pivoted to a position that exposes the blade arbor and blade thereby enabling a user to change the blade without interference from the swinging lower plate guard.

The upper post 148 is attached to a flat plate 152 that is generally shaped commensurate with a raised bead 154 outlined which is shown in FIG. 8 that is very generally shown as being rectangular. The plate 152 has its right end portion secured in the upper blade guard 132 by a screw 156 and its opposite end portion secured by a screw 158.

The screw 158 is threaded into the upper blade guard 132 and cooperates with a spot 159, the upper blade guard 132 is shown in FIG. 8 as being slightly angled so that as the plate 152 is rotated in a clockwise manner, the slot will be coextensive with the screw 158 so that it can be tightened to hold the plate 152 in place.

As was the case with the embodiment shown in FIGS. 1-4, FIG. 6 shows the motor and blade assembly 126 in its rest position, whereas FIG. 7 shows the same in an operational positional wherein the linkage mechanism 160 rotates the lower blade assembly in a counterclockwise direction so that the lower reach of the blade is exposed enabling it to cut a work piece (not shown).

Figure 6:
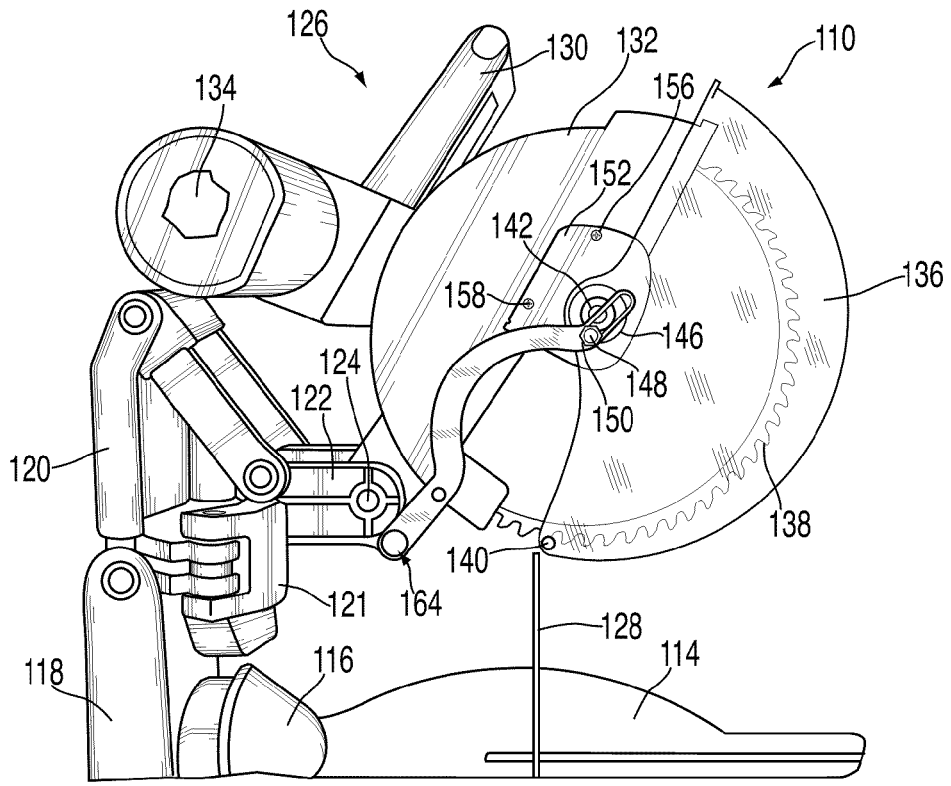
FIG. 6 is a side plan view of another preferred embodiment showing a portion of a compound miter saw, particularly illustrating a portion of the saw base and table and a frame support supporting a blade and motor assembly, and also illustrating a linkage mechanism for a lower swinging blade guard, with the motor and blade assembly in a rest or non-operating position.

As is evident from FIGS. 6-8, the elongated linkage mechanism 160 is not straight as it is in the embodiment of FIGS. 1-5, but is grooved in the general shape of a semi-circle that extends through approximately ⅔ of the center portion of the length of it. The linkage mechanism 160 also has an enlarged aperture 170 located at the base of the curve near the thumb screw 164. The aperture 170 is sized to be larger than the screw 158 and is conveniently placed so that it will hold the lower blade guard in its upper position as shown in FIG. 8. The thumb screw has been removed from the head 122. Thus, the lower guard 138 is held in the blade changing position by placing the hole 190 over the screw 158 that was loosened to permit the plate 152 to be rotated in a counterclockwise direction to the blade changing position.

Figure 9:
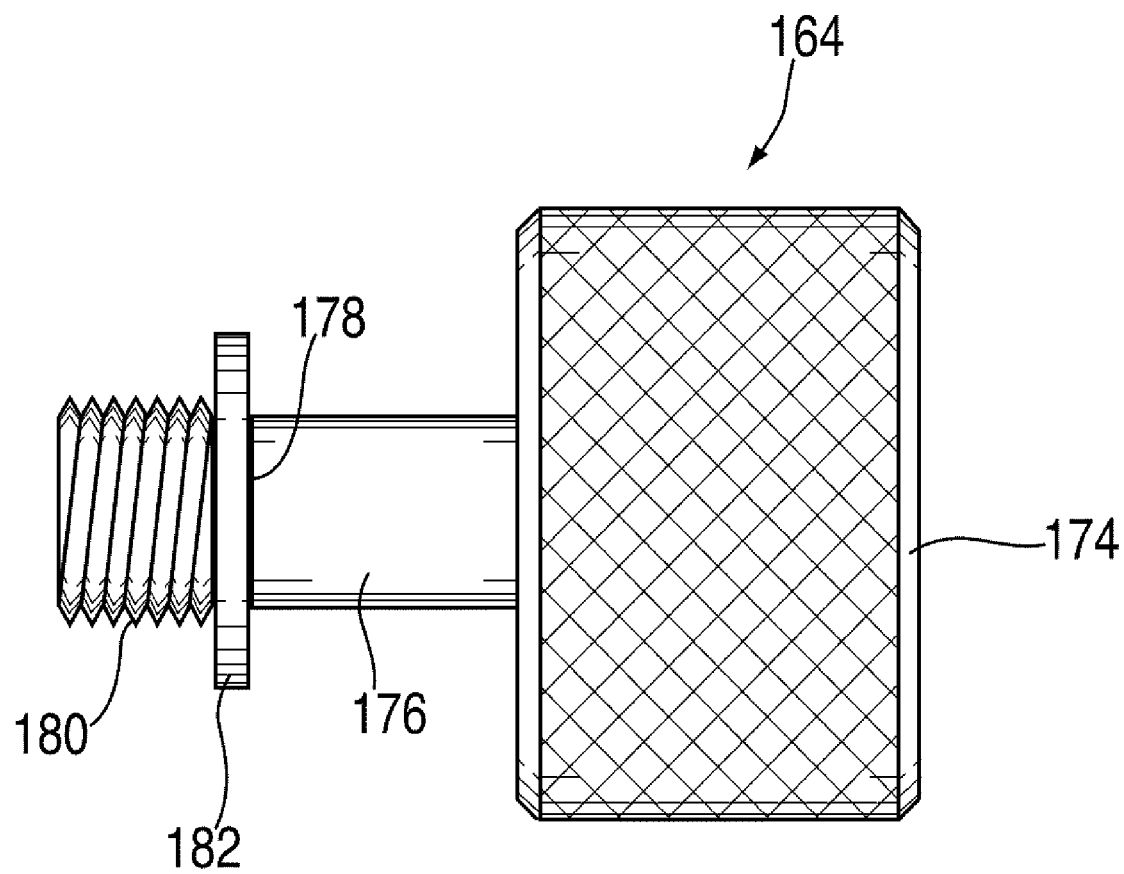
FIG. 9 is a side view of a thumb screw used in the embodiment shown in FIGS. 6-8 to attach one end of the link to the miter saw.

With regard to the thumb screw 164, it is shown in detail in FIG. 9 and comprises an enlarged cylindrical head portion 174 which preferably has a narrowed outer surface to facilitate easy gripping by a user for attaching and removing the same. The head 174 has a cylindrical shoulder portion 176 that has an annular groove 178 which then terminates in a threaded end portion 180. A retaining ring 182 is provided in the groove 178 which has an outer diameter that is larger than the opening 166 in which the thumb screw is attached. The length of the shoulder portion 176 is greater than the thickness of the length so that the thumb screw can be easily rotated to engage or disengage the threaded opening emboss of the head portion 122. The retaining ring is provided so that the thumb screw will remain attached to the elongated linkage mechanism 160. The retaining ring 182 is preferably a metal split-type retaining ring that has an inside diameter that can pass over the threaded end portion 180 and be fixed into the groove 178 of the shoulder screw.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power miter saw of the type which has a saw blade and motor assembly having a blade arbor on which a blade can be installed and a motor operatively connected to drive said arbor and an installed blade, a frame support for supporting said assembly, an upper fixed blade guard for encasing upper reaches of the installed blade without encasing the blade arbor, and a lower swinging blade guard for covering the lower reaches of the installed blade when the saw is in its rest position and for exposing the blade when moved to its operational position, the saw comprising:

an elongated linkage mechanism including a first end portion having a first connection to said frame support for supporting the saw blade and motor assembly and a second end portion having a second connection to said lower blade guard for moving said lower blade guard in response to movement of the saw between the rest and operational positions, such that the lower blade guard covers the lower reaches of the blade when the saw is in its rest position and uncovers the lower reaches of the blade when the saw is moved to its operational position;

wherein said linkage mechanism is substantially rigid and configured to be pivotable only at said first and second connections while maintaining a same shape during the movement of the saw between the rest and operational positions; and said linkage mechanism is further configured to be selectively detached at the first connection from said frame support, thereby enabling said lower blade guard to be placed in a change position wherein the lower blade guard is raised to expose the blade arbor to facilitate changing of the blade, and be reattached at the first connection to said frame support to hold said lower blade guard in said change position.

2. A power miter saw as defined in claim 1 wherein said frame support has a cylindrical post with an annular groove adjacent the free end thereof, and said linkage mechanism comprises a snap-fit connection that retains said linkage mechanism on said post, while permitting a user to detach said linkage mechanism from said post.

3. A power miter saw as defined in claim 1 wherein said frame support has a threaded boss configured to enable interconnection with said linkage mechanism, said linkage mechanism having a threaded thumb screw for engaging said threaded boss to thereby permit a user to attach and detach said linkage mechanism from said boss.

4. A power miter saw as defined in claim 3 wherein said thumb screw comprises:
- an enlarged head portion with an outer gripping surface;
- a shoulder portion which extends through an opening in said linkage mechanism, the length of said shoulder portion being greater than the thickness of said linkage mechanism so that said linkage mechanism is pivotable in said opening;
- a threaded end portion that that is configured to engage said threaded boss;
- an annular ring groove located between said shoulder portion and said threaded end portion; and
- a retaining ring located in said ring groove, said ring having an outer diameter greater that said opening through which said shoulder portion extends to thereby prevent said thumb screw from separating from said linkage mechanism.

5. A power miter saw as defined in claim 4 wherein said gripping surface is a knurled configuration.

6. A power miter saw as defined in claim 1 wherein said linkage mechanism has an elongated attachment slot in said second end portion configured to receive an attachment pin for operatively interconnecting said link to said lower blade guard.

7. A power miter saw as defined in claim 6 further comprising a generally flat plate for holding said attachment pin for operatively interconnecting said linkage mechanism to said lower blade guard, said flat plate being removably attached to said upper blade guard at two or more positions so that said plate can be rotated on said upper blade guard when only attached at one position, thereby enabling said attachment pin and lower blade guard to be moved an additional distance from said arbor.

8. A power miter saw as defined in claim 7 wherein said plate is attached to said upper blade guard with screws at opposite end portions thereof.

9. A power miter saw as defined in claim 1 wherein said elongated linkage mechanism is made of steel.

10. A power miter saw comprising:
- a saw base having a fence for positioning a work piece;
- a table rotatably connected to said saw base;
- a miter arm assembly for angularly positioning said table relative to said saw base;
- a saw blade and motor assembly having a blade arbor on which a blade can be installed and a motor operatively connected to drive said arbor and an installed blade; and
- a frame support on said table for supporting said saw blade and motor assembly, including a horizontal shaft about which said saw blade and motor assembly is pivotable to move vertically between an upper rest position and a lower operational position;
- said saw blade and motor assembly having an upper fixed blade guard for encasing upper areas of the installed saw blade without encasing said blade arbor, and a lower swinging blade guard pivotally mounted to said saw blade and motor assembly around a pivot connection generally concentric with said blade arbor for fully covering the installed blade when said saw blade and motor assembly is in its rest position and for exposing a lower reach of the blade when moved to its operational position;
- said saw blade and motor assembly comprising an elongated linkage mechanism with a first end portion having a first connection to said frame support and a second end portion having a second connection to said lower blade guard for moving the lower blade guard in response to movement of said saw blade and motor assembly between said rest and operational positions, such that said lower blade guard covers the lower reach of the blade when said saw blade and motor assembly is in its rest position and is moved to uncover the blade when the saw blade and motor assembly is moved to its operational position;
- wherein said linkage mechanism is substantially rigid and configured to be pivotable only at said first and second connections while maintaining a same shape during the movement of the saw between the rest and operational positions; and
- said linkage mechanism is further configured to be selectively detached at the first connection from said frame support, thereby enabling said lower blade guard to be placed in a change position wherein said lower blade guard is raised to expose said blade arbor to facilitate changing of the blade
- and be reattached at the first connection to said frame support to hold said lower blade guard in said change position.

11. A power miter saw as defined in claim 10 wherein said frame support has a cylindrical post with an annular groove adjacent the free end thereof, and said linkage mechanism comprises a snap-fit connection that retains said linkage mechanism on said post, while permitting a user to detach said linkage mechanism from said post.

12. A power miter saw as defined in claim 11 wherein said linkage mechanism has an opening at said first end portion, and said snap-fit connection comprises first and second components that cooperatively interconnect with one another and extend through said opening, at least one of said components having an inside diameter approximately the same as the diameter of said post, with said at least one component having resilient ears that extend into said annular groove when said snap-fit connection is attached to said post.

13. A power miter saw as defined in claim 12 wherein said snap-fit connection is made of a resilient plastic or plastic-like material.

14. A power miter saw as defined in claim 13 wherein said material is polypropylene.

15. A power miter saw as defined in claim 14 wherein said annular groove of said post has sloped sides to facilitate detachability of said snap-fit connection.

16. A power miter saw as defined in claim 15 wherein said resilient ears of said snap-fit connection have generally ramped contact surfaces that generally correspond to said sloped sides of said annular groove of said post.

17. A power miter saw comprising:
- a saw base having a fence for positioning a work piece;
- a table rotatably connected to said saw base;
- a miter arm assembly for angularly positioning said table relative to said saw base;
- a saw blade and motor assembly having a blade arbor on which a blade can be installed and a motor operatively connected to drive said arbor and an installed blade; and
- a frame support on said table for supporting said saw blade and motor assembly, including a horizontal shaft about which said saw blade and motor assembly is pivotable to move vertically between an upper rest position and a lower operational position;
- said saw blade and motor assembly having an upper fixed blade guard for encasing upper reaches of the installed saw blade without encasing said blade arbor, and a lower swinging blade guard pivotally mounted to said saw blade and motor assembly around a pivot connection generally concentric with said blade arbor for fully covering the lower reaches of the installed blade when said saw blade and motor assembly is in its rest position and for exposing the blade when moved to its operational position;

said saw blade and motor assembly comprising an elongated linkage mechanism with a first end portion having a first connection to said frame support and a second end portion having a second connection to said lower blade guard for moving the lower blade guard in response to movement of said saw blade and motor assembly between said rest and operational positions, such that said lower blade guard covers the lower reach of the blade when said saw blade and motor assembly is in its rest position and is moved to uncover the blade when the saw blade and motor assembly is moved to its operational position;

wherein said linkage mechanism is substantially rigid and configured to be pivotable only at said first and second connections while maintaining a same shape during the movement of the saw between the rest and operational positions; and said linkage mechanism is further configured to have said first connection be selectively detached from said frame support, thereby enabling said lower blade guard to be placed in a change position wherein the lower blade guard is raised to expose a blade arbor to facilitate changing of the blade, and be reattached to said upper fixed blade guard to hold said lower blade guard in said change position.

18. A power miter saw as defined in claim 17 wherein said linkage mechanism has an aperture between said first and second end portions for engaging a protrusion on said upper blade guard to thereby hold said lower blade guard in said second position.

* * * * *